United States Patent [19]

Ikeda

[11] Patent Number: 4,507,997
[45] Date of Patent: Apr. 2, 1985

[54] SHEARING MACHINE

[75] Inventor: Hidekatsu Ikeda, Hatano, Japan

[73] Assignee: Amada Company, Limited, Japan

[21] Appl. No.: 342,923

[22] Filed: Jan. 26, 1982

[30] Foreign Application Priority Data

| Jan. 30, 1981 | [JP] | Japan | 56-011086 |
| Feb. 10, 1981 | [JP] | Japan | 56-017517 |
| Feb. 10, 1981 | [JP] | Japan | 56-017518 |

[51] Int. Cl.³ .............................................. B26D 7/26
[52] U.S. Cl. .......................................... 83/368; 83/640
[58] Field of Search ................. 83/368, 360, 361, 362, 83/640, 641

[56] References Cited

U.S. PATENT DOCUMENTS

| 3,242,786 | 3/1966 | Giordano | 83/640 X |
| 3,282,141 | 11/1966 | Gautron | 83/640 X |
| 3,968,714 | 7/1976 | Kuchyt | 83/640 X |

FOREIGN PATENT DOCUMENTS

| 2245840 | 12/1973 | Fed. Rep. of Germany | 83/368 |
| 52-34077 | 9/1977 | Japan. | |
| 52-49588 | 12/1977 | Japan. | |

*Primary Examiner*—James M. Meister
*Attorney, Agent, or Firm*—Wigman & Cohen

[57] ABSTRACT

A shearing machine is disclosed comprising a detector for detecting the thickness of a workpiece placed on a work table, a clearance adjusting mechanism for moving at least one of the upper and lower blades towards and away from the other to adjust the clearance therebetween, a shear angle adjusting mechanism for adjusting the inclination of the blades with respect to each other, and a controlling system for controlling the adjustment of both of the adjusting mechanisms according to the thickness of the workpiece detected by the detecting means.

9 Claims, 8 Drawing Figures

SHEARING MACHINE

BACKGROUND OF THE INVENTION

1. Field of the Invention

The present invention relates generally to shearing machines having an upper and lower blades for cutting or shearing sheet-like workpieces such as sheet metals, and more particularly the present invention pertains to adjustments for adjusting the clearance between the upper and lower blades and the inclination of the upper blade to the lower blade depending upon thicknesses of workpieces to be sheared in shearing machines.

2. Description of the Prior Art

As is well-known, shearing machines for cutting or shearing sheet-like workpieces such as sheet metals are provided with an upper movable blade and a lower fixed blade which are flat and elongated in shape and are so arranged as to cooperate with each other to make shearing actions just like a pair of scissors or shears. The lower blade is horizontally fixed with its flat side vertically held, and the upper blade is disposed at an inclination or angle (shear angle) to the lower blade with its flat side vertically held so that it can be vertically moved toward and away from the lower blade to shear workpieces in cooperation therewith. Of course, the upper and lower blades are so disposed that they will overlap each other just like a pair of scissors when the upper blade is lowered to make a shearing action.

In shearing machines of the above described construction, it is necessary to adjust the clearance between the upper and lower blades depending upon thicknesses of workpieces to be sheared in order to perform accurate and fine shearing operations. More particularly, it is desired to make the clearance between the upper and lower blades as small as possible to perform accurate and fine shearing operations, but it is necessary to increase the clearance to shear thicker workpieces so as to decrease the wear of the upper and lower blades. Also, it is likewise necessary to adjust the shear angle namely inclination of the upper blade to the lower blade depending upon the thicknesses of workpieces to be sheared. It is desired to make the inclination of the upper blade as small as possible in order to deformations of workpieces to be sheared, but it is necessary to make the inclination larger to shear thicker workpieces so as to decrease the shearing force required.

Heretofore, it has been customary that the clearance between the upper and lower blades and the shear angle or the inclination of the upper blade are experientially determined and manually adjusted by operators of shearing machines depending upon thicknesses of workpieces to be sheared each time when different thicknesses of workpieces are to be sheared. Therefore, it has been very time-consuming especially where a variety of workpieces different in thickness are to be sheared in small quantities.

SUMMARY OF THE INVENTION

It is an object of the present invention to provide a shearing machine for shearing sheet-like workpieces such as sheet metals in which the clearance between the upper and lower blades can be automatically adjusted depending upon thicknesses of workpieces to be sheared.

It is another object of the present invention to provide a shearing machine for shearing sheet-like workpieces in which the shear angle that is the inclination of the upper blade to the lower blade can be automatically adjusted depending upon thicknesses of workpieces to be sheared.

According to the present invention, the above described objects are basically accomplished by providing detecting means for automatically detecting thicknesses of workpieces which are placed on a work-table of a shearing machine to be sheared thereby. Also, according to the present invention, there are provided adjusting means for automatically adjusting the clearance between the upper and lower blades and the shear angle according to the thicknesses of the workpieces which are detected by the detecting means.

Other and further objects and advantages of the present invention will be apparent from the following description and accompanying drawings which, by way of illustration, show preferred embodiments of the present invention and the principles thereof.

DESCRIPTION OF THE PREFERRED EMBODIMENTS

Figure 1:
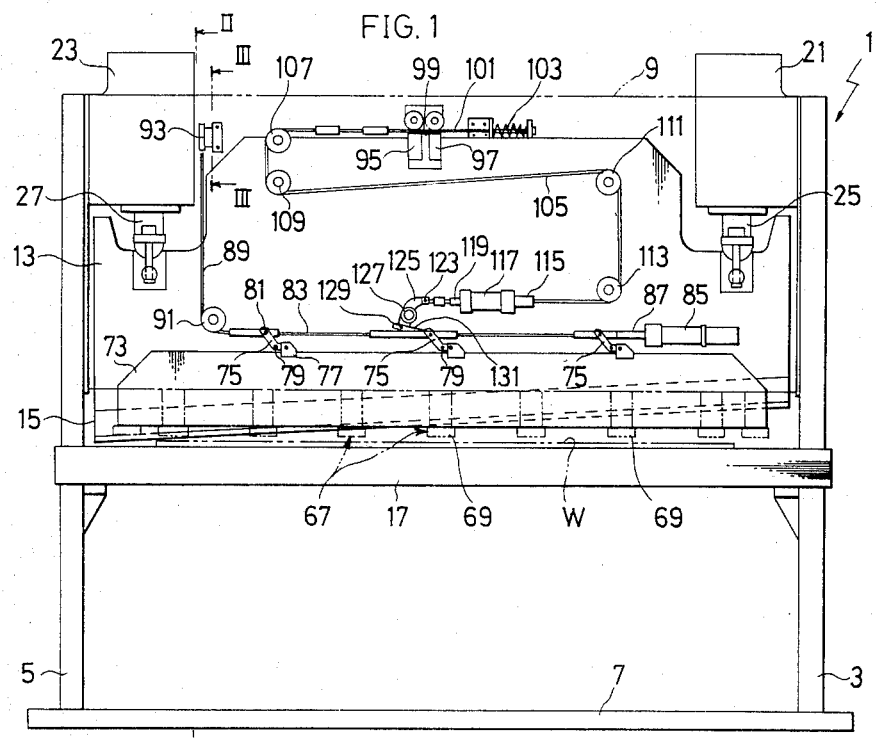
FIG. 1 is a front elevational view of a shearing machine embodying the principles of the present invention, and it is shown partially in section taken along the line I—I of FIG. 2.
Figure 2:
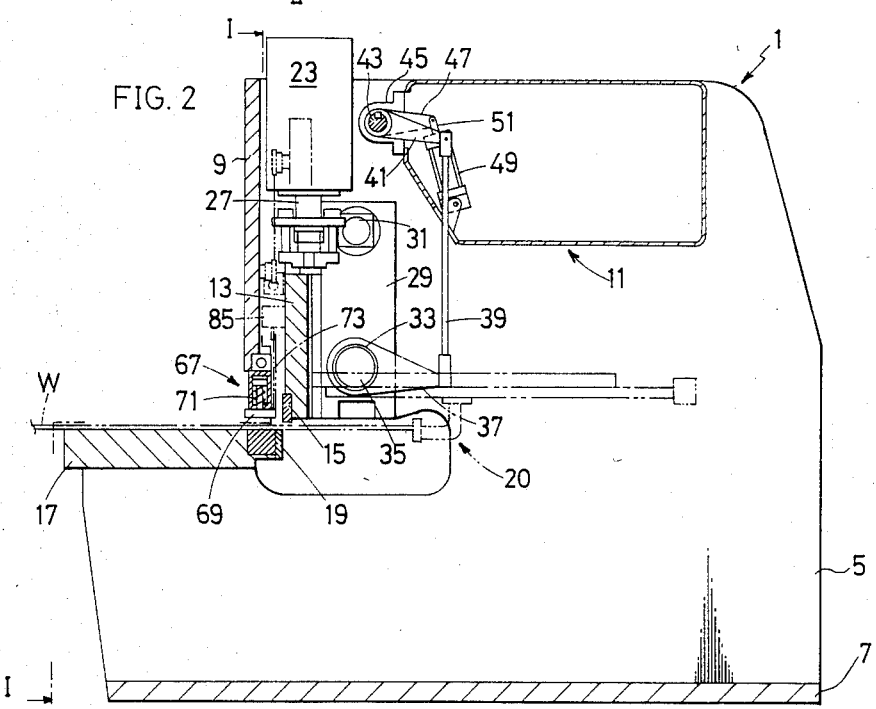
FIG. 2 is a sectional view taken along the line II—II of FIG. 1.

Referring now to FIGS. 1 and 2, there is shown a shearing machine 1 which comprises a pair of C-shaped upright plates 3 and 5 which are vertically disposed in parallel with each other and integrally connected with each other by a base plate 7 at their lower ends. The upright plates 3 and 5 are further connected with each other by a vertical front plate 9 at their front upper portions and also by a beam member 11 at their rear upper ends. Also, the shearing machine 1 is provided with a ram 13 which is vertically movably disposed behind the front plate 9 to hold an elongated upper blade 15, and it is further provided at its front portion with a work-table 17 on which a workpiece W to be sheared is to placed and also an elongated lower blade 19 is mounted. The lower blade 19 is horizontally fixed detachably at the rear end of the work-table 17, and the upper blade 15 is detachably fixed at the lower end of the ram 13 at an inclination or angle to the lower blade 19 so that it can cooperate therewith to shear the workpiece W when the ram 13 is lowered. Also, the shearing machine 1 is provided with a gauging stopper 20 so that the workpiece W to be sheared can be positioned in contact therewith.

The ram 13 is so arranged as to be vertically moved behind the front plate 9 by a pair of right-hand and left-hand hydraulic motors or cylinders 21 and 23 having piston and rods 25 and 27, respectively, so as to vertically move the upper blade 15 toward and away from the lower blade 19. The hydraulic motors 21 and 23 are mounted on the inner top sides of the upright plates 3 and 5, respectively, in such a manner that the piston and rods 25 and 27 are downwardly projected and extended to carry the ram 13. Thus, when the ram 13 is lowered by the piston and rods 25 and 27 of the hydraulic motors 21 and 23, the upper blade 15 will be lowered to cooperate with the lower blade 19 to shear the workpiece W which has been placed on the work-table 17.

In the above described arrangement, the ram 13 is pivotally held by the lower end of the piston and rods 25 and 27 of the hydraulic motors 21 and 23 by means of suitable connecting means in such a manner that it can be slightly swung frontward and rearward and also rightward and leftward. Thus, it will be understood that the clearance between the upper and lower blade 15 and 19 can be adjusted by slightly swinging the ram 13 either frontward or rearward. However, of course the clearance between the upper and lower blades 15 and 19 can be adjusted by horizontally moving the work-table 17 likewise, although it is adjusted by swinging the ram 13 in the preferred embodiment. Also, it will be understood that the shear angle namely the inclination of the upper blade 17 to the lower blade 19 can be adjusted by extending either of the piston and rods 25 and 27 of the hydraulic motors 21 and 23 lower or further than the other.

Referring to FIG. 2, in order to adjust the clearance between the upper and lower blades 15 and 17, the ram 13 is vertically slidably held or guided by a pair of elongated guide members 29 which are pivotally mounted by means of pins 31 on the inner sides of the upright plates 3 and 5 in such a manner as to be swung frontward and rearward. In this connection, it is to be noted that the guide members 29 and other related means and members shown in FIG. 2 as mounted on the inner side of the upright plate 5 are symmetrically mounted on both the inner sides of the upright plates 3 and 5, although the inner side of the upright plate 3 is not shown. Particularly stated, the ram 13 is vertically slidably held by the guide members 29 in such a manner that it can be slightly tilted therein rightward and leftward to adjust the shear angle namely the inclination of the upper blade 15 to the lower blade 17. Also, the guide members 29 holding the ram 13 is so arranged as to be swung around the pins 31 by eccentric cam members 33 which are rotatably held by pins 35 horizontally fixed to the inner sides of the upright plates 3 and 5. The eccentric cam members 33 are disposed to horizontally pass through the lower ends of the guide members 29 horizontally in such a manner as to swing the guide members 29 when rotated, and they are provided with rearwardly extended lever members 37 so as to be rotated thereby.

Figure 3:
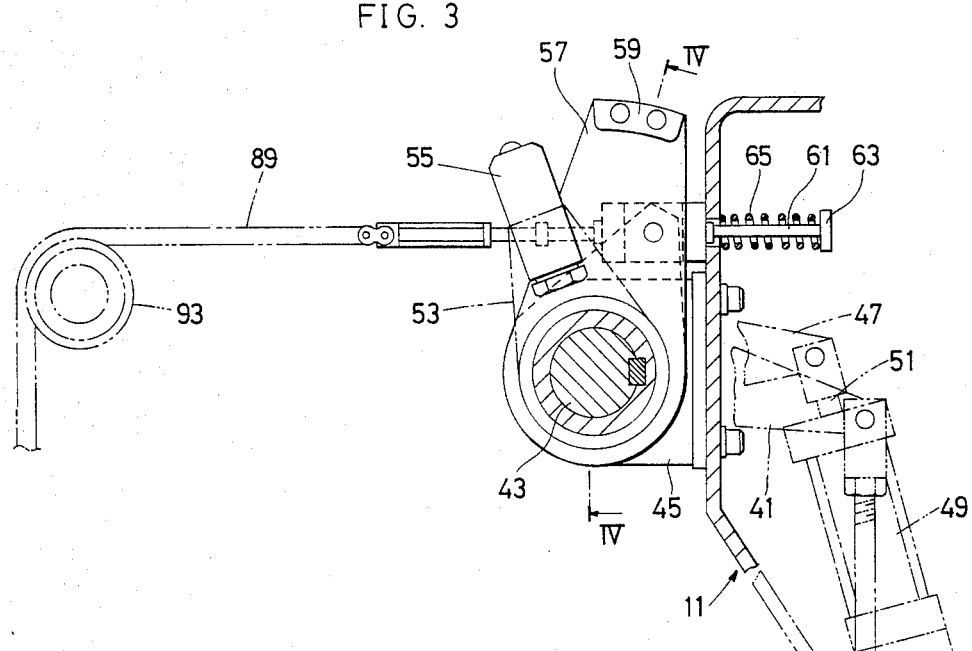
FIG. 3 is a partial sectional view taken along the line III—III of FIG. 1.
Figure 4:
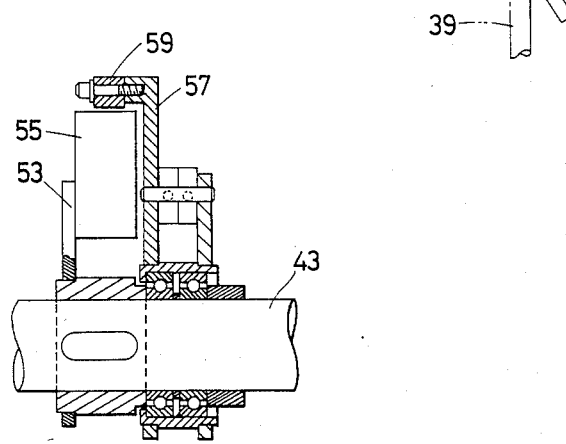
FIG. 4 is a partial sectional view taken along the line IV—IV of FIG. 3.

Referring to FIG. 2 and also to FIGS. 3 and 4, the lever members 37 for rotating the eccentric cam members 33 are pivotally connected to rod members 39 which are upwardly extended and are pivotally connected to lever members 41 so as to be vertically moved thereby. The lever members 41 are substantially horizontally disposed and are integrally fixed to a shaft 43 which is horizontally disposed in parallel with the beam member 11 and is rotatably journaled in bearing means 45 fixed to the front portions of the beam member 11. The shaft 43 is provided with lever members 47 and is so arranged as to be rotated by means of the lever members 47 by hydraulic motor or cylinders 49 which have piston rods 51 pivotally connected to the lever members 47 and are mounted on the beam member 11. In this arrangement, when the shaft 43 is rotated by the hydraulic motors 49 by means of the lever members 47, the lever members 37 will be swung by the shaft 43 through the lever members 41 and the rod members 39 to rotate the eccentric cam members 33 to swing the guide members 29 together with the ram 13. Thus, it will be now understood that the clearance between the upper and lower blades 15 and 19 can be adjusted according to the thickness of the workpiece W to be sheared by controlling the hydraulic motors 49.

As shown in FIGS. 3 and 4, in order to control the hydraulic motors 49, an arm member 53 having a control valve means 55 are integrally fixed to the shaft 43, and also an arm member 57 having a cam member 59 are rotatably provided on the shaft 43. In this connection, the arm members 53 and 57 as well as the control valve means 55 and the cam member 59, respectively, are provided near the upright plate 5 only in the preferred embodiment in such a manner as to control both of the hydraulic motors 49. The arm member 57 is so arranged as to bring the cam member 59 into and out of contact with the control valve means 55 when it is rotated on the shaft 43. Also, the control valve means 55 is so arranged as to extend the piston rods 51 of the hydraulic motors 49 when in contact with the cam member 59 and stop the piston rods 51 from extending when out of contact with the cam member 59. Thus, when the arm member 57 has been rotated on the shaft 43 to bring the cam member 59 into contact with the control valve means 55, the hydraulic motors 49 will rotate the shaft 43 together with the arm member 53 until the control valve means 55 held by the arm member 53 are brought out of contact with the cam member 59. Also, in order to rotate the arm member 57 on the shaft 43, a pull rod 61 having a spring shoe 63 is connected to the arm member 57, and it is biased by a spring 65 in such a manner as to enable the arm member 57 to keep the cam member 59 out of contact with the control valve means 55. Thus, it will be now understood that the clearance between the upper and lower blades 15 and 19 can be adjusted according to the thickness of the workpiece W to be sheared by pulling the pull rod 61 to rotate the arm member 57 on the shaft 43.

As seen from FIG. 1 and 2, in order to hold down the workpiece W to be sheared on the work-table 17, the front plate 9 is provided at its lower end with a pluraliry of hold-down means 67. In the preferred embodiment, the hold-down means 67 are of hydraulic motors each having a holding pad member 69 which is upwardly biased by a spring 71 and can be lowered by hydraulic fluid to hold the workpiece W.

Figure 5:
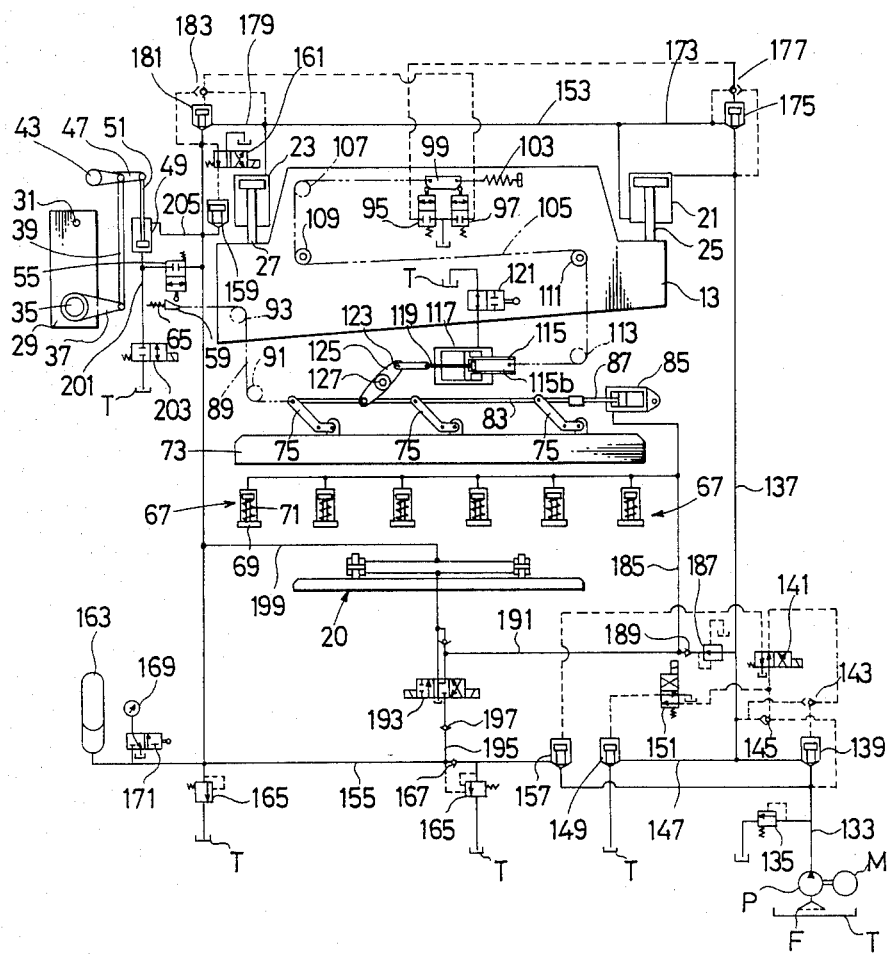
FIG. 5 is a schematic view showing a hydraulic circuit of the shearing machine shown in FIG. 1.

As shown in FIGS. 1 and 2 and also in FIG. 5, in order to detect or sense the thickness of the workpiece W to be sheared, an elongated plate-like detecting member 73 is pivotally connected to the front plate 9 by means of a plurality of lever members or bell cranks 75. The detecting member 73 is horizontally disposed behind the front plate 9 in such a manner as to ride on the holding pad members 69 of the hold-down means 67 and be moved up and down together therewith by the lever member 75. Also, each of the lever members 75 is pivotally connected at its lower end to the detecting member 73 by a pin 77 and at its mid portion to the front plate 9 by a pin 79, and also they are further connected pivotally at their top ends each by a pin 81 to a pull rod 83 which is horizontally disposed above the detecting member 73. More particularly, the arrangement is such that the detecting member 73 is moved up and down by the lever members 75 in such a manner as to be always kept horizontal when the lever members 75 are pulled or released by the pull rod 83. Also, the pull rod 83 is kept biased leftward in the preferred embodiment in a manner to be described hereinafter to normally keep the detecting member 73 raised, and it is so arranged as to be pulled rightward as viewed in FIG. 1 by a hydraulic motor or cylinder 85 which has a piston rod 87 and is mounted on the rear side of the front plate 9. Thus, the detecting member 73 will be lowered by the lever members 75 to follow the holding pad members 69 of the hold-down means 67 when the pull rod 83 is pulled rightward by the hydraulic motor 85, and it will be raised by the lever members 75 when the pull rod 83 is pulled leftward. In this arrangement, it will be understood that the thickness of the workpiece W placed on the work-table 17 can be detected or sensed by the detecting member 73 and can be transmitted to the pull rod 83 when the holding pad members 69 of the hold-down means 67 hold down the workpiece W with the detecting member 73 riding thereon. In this connection, it is readily apparent that the thickness of the workpiece W can be detected by bringing the detecting member 73 into contact with the workpiece W directly without through the holding pad members 69 of the hold-down means 67.

As shown in FIGS. 1, 3 and 5, the pull rod 83 is connected to the pull rod 61 by a flexible connecting member 89 such as a chain or wire trained around wheels 91 and 93 such as sprockets or pulleys which are rotatably provided on the front plate 9. Thus, the pull rod 83 is always kept biased leftward by the spring 65 through the connecting member 89 and the pull rod 61, and it will pull the pull rod 61 against the spring 65 through the connecting member 89 to rotate the arm member 57 on the shaft 43 when pulled by the hydraulic motor 85. In this arrangement, when the pull rod 83 is pulled by the hydraulic motor 85 to lower the detecting member 73 by means of the lever members 75, the arm member 57 will be simultaneously rotated on the shaft 43 by the pull rod 61 to bring the cam member 59 into contact with the control valve means 55. Stated otherwise, when the detecting member 73 is lowered by the pull rods 83 by means of the lever members 75 to detect the thickness of the workpiece W to be sheared, the arm member 57 will be rotated together with the cam member 59 to control the hydraulic motor 49 according to the thickness of the workpiece W detected by the detecting member 73. As has been described hereinbefore, the hydraulic motor 49 is arranged to rotate the shaft 43 by means of the lever member 47 to move the guide members 29 holding the ram 13 frontward and rearward by means of the lever members 41, the rod members 39, the lever members 37 and the eccentric cam members 33. Thus, it will be now understood that the clearance between the upper and lower blade 15 and 19 is adjusted according to the thickness of the workpiece W to be sheared which is detected by the detecting member 73 and is transmitted to the control valve means 55 to control the hydraulic motor 49.

Referring to FIGS. 1 and 5, in order to adjust the shear angle namely the inclination of the upper blade 15 to the lower blade 17, a first ram controlling valve means 95 and a second ram controlling valve means 97 are mounted side by side on the rear side of the front plate 9 to control the right-hand and left-hand hydraulic motors 21 and 23. Also, a cam member 99 which may be termed dog member otherwise is movably provided on the rear side of the front plate 9 so that it can alternatively push or actuate either of the first and second ram controlling valve means 95 and 97 when brought into contact therewith. As will be described in great detail, the first ram controlling valve means 95 is so arranged as to lower or extend only the piston and rod 25 of the right-hand hydraulic motor 21. When pushed or actuated by the cam member 99. On the other hand, the second ram controlling valve means 97 is contrarily so arranged as to lower or extend only the piston and rod 25 of the left-hand hydraulic motor 23 and simultaneously raise the piston and rod 25 of the right-hand hydraulic motor 21 when actuated by the cam member 99, as will be also described hereinafter. In this arrangement, when the first ram controlling valve means 95 is actuated by the cam member 99, the right-hand hydraulic motor 21 will urge downwardly only the right-hand portion of the ram 13 to lower the right-hand portion of the upper blade 15. Also, when the second ram controlling valve means 97 is actuated by the cam member 99, the left-hand hydraulic motor 23 will urge downwardly only the left-hand portion of the ram 13 to lower the left-hand portion of the upper blade 15 and also the right-hand hydraulic motor 21 will urge upwardly the right-hand portion of the ram 13 to raise the right-hand portion of the upper blade 15. Thus, it will be understood the shear angle or the inclination of the upper blade 15 can be adjusted by moving the cam member 99 into contact with either of the first and second ram controlling valve means 95 and 97.

As seen from FIG. 1, the cam member 99 is fixed to an elongated rod member 101 which is horizontally slidably provided on the rear side of the front plate 9 in such a manner that the cam member 99 can be horizontally moved into contact with the first and second ram controlling valve means 95 and 97 when moved leftward and rightward, respectively, in the preferred embodiment. The rod member 101 holding the cam member 99 is kept biased by a spring 103 rightward in the preferred embodiments in such a manner that the cam member 99 is normally kept at its neutral position out of contact with both of the first and second ram controlling valve means 95 and 97 as will be seen hereinafter.

As shown in FIGS. 1 and 5, the rod member 101 is so arranged as to be pulled leftward against the spring 103 by a connecting member 105 such as a chain or wire which is trained around wheels 107, 109, 111 and 113 such as sprockets or pulleys and is connected to a piston and rod 115 slidably enclosed in a hydraulic cylinder 117. The wheels 107 and 113 are rotatably provided at an upper left-hand portion and a lower right-hand portion, respectively, of the rear side of the front plate 9. While, the wheels 109 and 111 are rotatably provided preferably on a level with each other on the front side of the ram 13 beneath the wheel 107 and above the wheel 113, respectively. In this arrangement, when the connecting member 105 is pulled by the piston and rod 115 of the hydraulic cylinder 117 against the spring 103, the cam member 77 will be brought by the rod member 101 into contact with the first ram controlling valve means 95 to lower the right-hand portions of the ram 13 and upper blade 15. Also, when the right-hand portions of the ram 13 and the upper blade 15 has been lowered to loose the connecting member 105. The cam member 99 will be brought back by the spring 103 by means of the rod member 101 to its neutral position to stop the right-hand portions of the ram 13 and the upper blade 15 from further lowering. Furthermore, the cam member 99 will be brought into contact with the second ram controlling valve means 97 by the spring 103 to lower the left-hand portions of the ram 13 and the upper blade 15 and also simultaneously raise the right-hand portions thereof when the connecting member 105 is loosed. In this connection, the connecting member 105 is loosed when the right-hand portions of the ram 13 and the upper blade 15 are lowered to bring down the wheel 111 near to the wheel 113, although it is normally kept tensioned against the spring 103 to keep the cam member 99 at its neutral position as will be described hereinafter.

As is shown in FIG. 5, the piston and rod 115 is horizontally slidably enclosed in the hydraulic cylinder 117 to project rightward to be connected to the connecting member 105, and it is formed at its rod portion with an elongated bore 115b just like a sleeve. The hydraulic cylinder 117 is provided with a slide rod 119 which is slidably disposed therein and in the bore 115b of the piston and rod 115 in such a manner that it is projected leftward and can pull leftward the piston and rod 115 together with the connecting member 105. Also, the hydraulic cylinder 117 is provided with a directional control valve means 121 which is shown as a manually operated type in FIG. 5 but may be of a solenoid operated type and is so arranged as to be alternatively opened and closed to connect and disconnect the rod end of the hydraulic cylinder 117 with the hydraulic tank T. Stated particularly, the hydraulic cylinder 117 is so designed that the piston and rod 115 can move therein when the directional control valve means 121 is kept open but will be stopped from moving by the hydraulic fluid sucked into the rod end of the hydraulic cylinder 117 when the directional control valve means 121 is closed. In this arrangement, when the directional control valve means 121 is kept open to connect the rod end of the hydraulic cylinder 117 to the hydraulic tank T, the piston and rod 115 can be pulled leftward by the slide rod 119 to pull the connecting member 105. However, when the directional control valve means 121 is kept closed, the piston and rod 115 is kept stopped from moving and will hold the connecting member 105 tensioned against the spring 103. Of course, when the directional control valve means 121 is kept closed, the slide rod 119 can not move leftward to pull the piston end rod 115, but it can move rightward in the hydraulic cylinder 117 and the piston end rod 115.

Referring further to FIGS. 1 and 5, the slide rod 119 is pivotally connected by a pin 123 to a lever member 125 which is pivotally held at its mid portion by a pin 127 fixed to the rear side of the front plate 9. The lever member 125 is pivotally connected at its lower end by a pin 129 to a link member 131 which is pivotally connected to the pull rod 83 connected to the detecting member 73. Thus, the slide rod 119 will be pulled by the pull rod 83 by means of the link member 131 and the lever member 125 to pull the connecting member 105 by means of the piston and rod 115 of the hydraulic cylinder 117, when the pull rod 83 is pulled by the hydraulic motor 85 to lower the detecting member 73. Stated otherwise, the connecting member 105 will be pulled originally by the pull rod 83 to bring the cam member 99 into contact with the first ram controlling valve means 95 when the detecting member 73 is lowered by the pull rod 83 by means of the lever members 75 to detect the thickness of the workpiece W to be sheared. Accordingly, the first ram controlling valve means 95 will cause the right-hand hydraulic motor 21 to lower the right-hand portions of the ram 13 and the upper blade 15 according to the thickness of the workpiece W to be sheared detected by the detecting member 73. Thus, it will be now understood that the shear angle or the inclination of the upper blade 15 to the lower blade 19 can be automatically adjusted by the right-hand hydraulic motor 21 and also by the left-hand hydraulic motor 23, according to the thickness of the workpiece W to be sheared which is automatically detected by the detecting member 73, and transmitted to the pull rod 83 by means of the lever members 75 as has been described hereinbefore.

In the above described arrangement, in order to adjust or determined the shear angle according to the thickness of the workpiece W, the directional control valve means 121 is opened so that the slide rod 119 can pull the piston and rod 115 in the hydraulic cylinder 117 when the pull rod 83 is pulled by the hydraulic motor 85. When the piston and rod 115 is pulled by the slide rod 119, the cam member 99 will be moved by the piston and rod 115 by means of the connecting member 105 into contact with the first ram controlling valve means 95 to cause the right-hand hydraulic motor 21 to lower the right-hand portions of the ram 13 and the upper blade 15. The right-hand hydraulic motor 21 will lower the right-hand portions of the ram 13 and the upper blade 15 according to the thickness of the workpiece W to be sheared, since the first ram controlling valve means 95 is moved originally by the pull rod 83 according to the thickness of the workpiece W detected by the detecting member 73. Thus, the shear angle can be automatically adjusted or determined by the first ram controlling valve means 95 and the right-hand hydraulic motor 21 according to the thickness of the workpiece W detected by the detecting member 73 when the directional control valve means 121 is kept opened. Also, as soon as the shear angle has been adjusted or determined, the right-hand hydraulic motor 21 will stop lowering the ram 13 and the upper blade 15, since the ram 13 will bring down the wheel 111 near to the wheel 113 to loose the connecting member 105 so that the cam member 99 can be moved by the spring 103 out of contact with the first ram controlling valve means 95. In this connection, when the right-hand portions of the ram 13 and the upper blade 15 is lowered too much by the inertia thereof, the cam member 99 will be moved by the spring 103 from its neutral position into contact with the second ram controlling valve means 97 to lower the left-hand positions of the ram 13 and the upper blade 15, since the wheel 111 is brought down near to the wheel 113 to loose the connecting member 105.

After the shear angle has been adjusted or determined, the ram 13 is lowered or driven by both of the right-hand and left-hand hydraulic motors 21 and 23 to enable the upper and lower blades 15 and 19 to shear the workpiece W. When the ram 13 is being driven downwardly by the right-hand and left-hand hydraulic motors 21 and 23, the cam member 99 is kept at its neutral position out of contact with both of the first and second ram controlling valve means 95 and 97 to keep the shear angle adjusted or determined until the workpiece W has been sheared. It will be understood that, although the distance between the wheels 107 and 109 will become longer as the ram 13 is lowered, the distance between the wheels 111 and 113 will correspondingly become shorter to keep the cam member at the neutral position. After the workpiece W has been sheared, the cam member 99 will be moved by the spring 103 from the neutral position into contact with the second ram controlling valve means 97 to raise and return the right-hand portions of the ram 13 and the upper blade 15 to their original positions since the pull rod 83 is released from the hydraulic motor 85.

In case that it is desired to maintain the shear angle adjusted or determined to continuously shear workpieces of the same thickness, the directional control valve means 121 is closed after the shear angle has been adjusted or determined. As will be readily apparent, the piston and rod 115 is held stopped from moving in the hydraulic cylinder 117 to hold the connecting member 105 tensioned against the spring 103 when the directional control valve means 121 is kept closed. By closing the directional control valve means 121, the connecting member 105 and thus the angle adjusting means are effectively disengaged from the thickness detecting member 73 and the pull rod 83 which otherwise control the angle adjusting means.

Also, it will be understood that the slide rod 119 can be moved in the bore 115b of the piston and rod 115 by the pull rod 83 by means of the lever member 125 when the piston and rod 115 is kept stopped from moving in the hydraulic cylinder 117 with the directonal control valve means 121 kept closed.

As shown in FIG. 5, the right-hand and left-hand hydraulic motors 21 and 23 and also the hydraulic motors 49 and 85 are collectively connected to a hydraulic pump P which is to be driven by an electric motor M and is connected to the hydraulic tank T through a filter F. In order to originally send out the hydraulic fluid, the hydraulic pump P is connected to a main passage 133 where a relief valve means 135 is provided as is conventional. In this connection, the directional control valve means 121 connected to the hydraulic cylinder 117 is directly connected to the hydraulic tank T so as to enable the piston and rod 115 to suck and drain the hydraulic fluid into and out of the hydraulic cylinder 117.

In order to drive the right-hand hydraulic motor 21, the main passage 133 is connected to the head end of the hydraulic motor 21 by a passage 137 where a pilot valve means 139 is provided to alternatively allow and block the hydraulic fluid to pass therethrough. The pilot valve means 139 is so arranged as to be operated by a solenoid operated valve means 141 by means of shuttle valve means 143 and 145 to open and close the passage 137. Also, the passage 137 is connected to the hydraulic tank T by a drain passage 147 is connected to between the pilot valve means 139 and the right-hand hydraulic motor 21 and is provided with a pilot valve means 149 operated by a solenoid valve means 151. Thus, the hydraulic fluid is delivered into the head end of the hydraulic motor 21 by the hydraulic pump P through the passage 133 with the pilot valve means 139 opened when the ram 13 is to be driven downwardly, and it is drained therefrom through the drain passage 147 with the pilot valve means 139 closed when the ram 13 is raised.

The rod end of the right-hand hydraulic motor 21 is connected to the head end of the left-hand hydraulic motor 23 by a passage 153 in tandem so that the piston and rods 25 and 27 of the hydraulic motors 21 and 23, respectively, may be simultaneously or synchronously driven to lower and raise the ram 13. Stated more particularly, the arrangement is such that the effective annular area at the underside of the piston and rod 25 of the right-hand hydraulic motor 21 is equal to the full area at the top of the piston and rod 27 of the left-hand hydraulic motor 23. In this arrangement, the ram 13 will be driven downwardly to lower the upper blade 15 when the head end of the right-hand hydraulic motor 21 is supplied with the hydraulic fluid, and also the ram 13 will be upwardly driven to raise the upper blade 15 when the rod end of the left-hand hydraulic motor 23 is supplied with the hydraulic fluid.

In order to supply the hydraulic fluid into the left-hand hydraulic motor 23, the main passage 133 is connected to the rod end thereof by a passage 155 where a pilot valve means 157 is provided and also another pilot valve means 159 is provided between the pilot valve means 157 and the hydraulic motor 23. The pilot valve means 157 is so arranged as to be operated by the solenoid operated valve means 141 to open the passage 155 when the ram 13 is to be raised and close the passage 155 when the ram 13 is lowered. The pilot valve means 159 is so arranged as to be operated by a solenoid operated valve means 161 to open the passage 155 when the ram 13 is raised and lowered and close the passage 155 when the ram 13 is to be kept stopped. Also, the passage 155 is provided with an accumulator 163 and a relief valve means 165 between the pilot valve means 157 and 159, and it is also provided with a check valve means 167 between the pilot valve means 157 and the accumulator 163 and the relief valve means 165 to block the hydraulic fluid from returning directly to the hydraulic pump P. Thus, when the ram 13 is lowered, the hydraulic fluid which has been delivered into the rod end of the hydraulic motor 23 is partially urged into the accumulator 163 to be accumulated therein and also is partially drained into the hydraulic tank T through the relief valve means 165. Of course, when the ram 13 is to be raised, the hydraulic fluid is delivered into the rod end of the hydraulic motor from the hydraulic pump P through the passage 155 with the pilot valve means 157 and 159 kept opened. However, it will be understood that the ram 13 can be rapidly raised by the hydraulic fluid accumulated in the accumulator 163 in addition to the hydraulic fluid which is delivered from the hydraulic pump P. Also, the passage 155 is further provided with a pressure gauge 169 which is shown in FIG. 5 as connected between the pilot valve means 157 and 159 by means of a manually operated valve means 171.

The head end and the rod end of the right-hand hydraulic motor 21 are connected with each other by a passage 173 which is provided with a pilot valve means 175 connected with a shuttle valve means 177. The pilot valve means 175 is connected through the shuttle valve means 177 to the first ram controlling valve means 95, and it is so arranged as to open the passage 173 when the cam member 99 is in contact with the first ram controlling valve means 95. In this arrangement, as soon as the cam member 99 is brought into the first ram controlling valve means 95, the head end and the rod end of the right-hand hydraulic motor 21 will be hydraulically connected or communicated with each other by the pilot valve means 175 so as to lower the piston and rod 25. It will be understood that the piston and rod 25 will be lowered when the head end and the rod end of the hydraulic motor 21 are hydraulically connected, since the effective area at the top of the piston and rod 25 is larger than that at the underside thereof. Thus, it will be readily apparent the hydraulic motor 21 will lower the right-hand portions of the ram 13 and the upper blade 15 by means of the piston and rods 25 according to the thickness of the workpiece W to be sheared when the cam member 99 is brought into contact with the first ram controlling valve means 95 to enable the pilot valve means 175 to open the passage 173.

The head end of the left-hand hydraulic motor 23 is connected to the passage 155 by a passage 179 which is provided with a pilot valve means 181 connected with a shuttle valve means 183. The pilot valve means 181 is connected by means of the shuttle valve means 183 to the second ram controlling valve means 97, and it is so arranged as to open the passage 179 when the cam member 99 is in contact with the second ram controlling valve means 97. Thus, the head end and the rod end of the left-hand hydraulic motor 23 are hydraulically connected or communicated with each other when the cam member 99 is in contact with the second ram controlling valve means 97 to enable the pilot valve means 181 to open the passage 179 and the solenoid operated valve means 161 is energized to enable the pilot valve means 159 to open the passage 155. Also, the piston and rod 27 of the left-hand hydraulic motor 23 will be lowered when the passages 179 and 155 are opened by the pilot valve means 181 and 159, respectively, since the effective area at the top of the piston and rod 27 is larger than that of the underside thereof. In this connection, the solenoid operated valve means 161 is electrically so arranged as to be energized to enable the pilot valve means 159 to open the passage 155 when the ram 13 is to be lowered and raised and also when the right-hand portions of the ram 13 is lowered too much to adjust the shear angle according to the thickness of the workpiece W to be sheared.

In the above described arrangement, when the cam member 99 is brought into contact with the second ram controlling valve means 97 with the solenoid operated valve means 161 energized, the left-hand portions of the ram 13 and the upper blade 15 will be lowered by the left-hand hydraulic motor 23. As has been described hereinbefore, the cam member 99 will be brought into contact with the second ram controlling valve means 97 by the spring 103 when the right-hand portions of the ram 13 and the upper blade 15 are lowered by the inertia thereof too much to adjust the shear angle. Thus, the left-hand portions of the ram 13 and the upper blade 15 can be lowered by the hydraulic motor 23 as soon as the right-hand portions thereof are lowered too much when the shear angle is to be adjusted or determined according to the thickness of the workpiece W to be sheared.

On the other hand, the cam member 99 will be also brought into contact with the second ram controlling valve means 97 by the spring 103 when the ram 13 has been raised to the uppermost limit with the directional control valve means 121 kept opened after shearing the workpiece. It will be understood that the connecting member 105 will be loosed to enable the spring 103 to pull the cam member 99 into contact with the second ram controlling means 97 when the ram 13 has been raised to the uppermost limit, as far as the piston and rod 115 is free to move in the hydraulic cylinder 117 with the directional control valve means 121 kept opened. Also, when the ram 13 has been raised to the uppermost limit to stop thereat, the solenoid operated valve means 161 will be deenergized to enable the pilot valve means 159 to close the passage 155 as has been described hereinbefore. Thus, as soon as the ram 13 has been raised to the uppermost limit with the directional control valve means 121 kept opened, the hydraulic fluid will be delivered from the hydraulic pump P into the rod end of the right-hand hydraulic motor 21 through the pilot valve means 181 and the passages 179 and 153 to raise the right-hand portions of the ram 13 and the upper blade 15. However, as far as the directional control valve means 121 is kept closed to stop the piston and rod 115 from moving in the hydraulic cylinder 117, the right-hand portions of the ram 13 and the upper blade 15 will not raised so as to keep the shear angle adjusted or determined, whether or not the ram 13 is at the uppermost limit.

As is shown also in FIG. 5, the hydraulic motor 85 for pulling the pull rod 83 and the hydraulic motors of the hold-down means 67 are connected to the passage 137 by a passage 185 which is provided with a reducing valve means 187 for reducing the pressure of the hydraulic fluid delivered thereinto. The passage 185 is further provided with a check valve means 189 between the reducing valve means 187 and the hydraulic motor 85 and the hold-down means 67 to block the hydraulic fluid from directly returning to the passage 137. Also, another passage 191 is connected to the passage 185 between the check valve means 189 and the hydraulic motors 85 and the holddown means 67, and it is connected to a solenoid operated valve means 193 which is so arranged as to alternatively block the hydraulic fluid from draining from the passage 185 draining therefrom. In this arrangement, the hydraulic motor 85 and the hold-down means 67 are simultaneously supplied with the hydraulic fluid from the hydraulic pump P through the passages 137 and 185 to simultaneously or synchronously pull the pull rod 83 and lower the holding pad members 69 of the hold-down means 67. Thus, it will be understood that the holding pad members 69 of the hold-down means 67 and the detecting member 73 are simultaneously or synchronously lowered to hold down the workpiece W to be sheared and detect the thickness of the workpiece W, respectively. Also, when the hydraulic fluid is drained from the passage 185 through the solenoid operated valve means 193, the holding pad members 69 and the hold-down means 67 is raised by the spring 71 and the detecting member 73 will be raised by the spring 65 by means of the pull rod 83 and the lever members 75.

In this connection, the solenoid operated valve means 193 is so arranged as not only to drain and hold the hydraulic fluid in the passage 185 but also to alternatively pass the hydraulic fluid for driving the gauging stopper 20 and drain it to the hydraulic tank T therethrough in the preferred embodiment. For this purpose, the solenoid operated valve means 193 is connected to the passage 155 by a passage 195 having a check valve means 197, and it is hydraulically connected by a passage 199 to the gauging stopper 20 which is shown in FIG. 5 as connected at its opposite side directly to the passage 155.

As is further shown in FIG. 5, the head end of the hydraulic motor 49 for adjusting the clearance between the upper and lower blades 15 and 19 is connected to the passage 155 between the check valve means 167 and the pilot valve means 159 by a passage 201. The control valve means 55 for controlling the hydraulic motor 49 is provided in the passage 201 so as to normally keep the passage 201 closed and open the passage 201 when pushed by the cam member 59. Also, a solenoid operated valve means 203, which is kept normally closed, is connected to the passage 201 between the control valve means 55 and the head end of the hydraulic motor 49 so that it may drain the hydraulic fluid therefrom to the hydraulic tank T when energized. On the other hand, the rod end of the hydraulic motor 49 is connected by a passage 205 to the passage 155 between the check valve means 167 and the pilot valve means 159. Thus, when the control valve means 55 is pushed by the cam member 59 to open the passage 201, the piston and rod 51 will be extended to push the lever member 47 to ultimately move the guide member 29 and the ram 13 so as to adjust the clearance between the upper and lower blades 15 and 17 as has been described hereinbefore. It will be readily apparent that the piston and rod 51 will be extended to push the lever member 47 when the passage 201 is kept open, since the effective area at the head of the hydraulic motor 49 is larger than that at the rod end thereof. Also, the piston and rod 51 will be retracted into the hydraulic motor 49 to pull the lever member 47 when the cam member 59 is brought out of contact with the control valve means 55 to close the passage 201 and the solenoid operated valve means 203 is energized to drain the hydraulic fluid therethrough. Of course, it will be understood that the piston and rod 51 will be kept stopped from moving when the passage 201 is kept closed by the control valve means 55 and the solenoid operated valve means 203 is kept deenergized.

Figure 6:
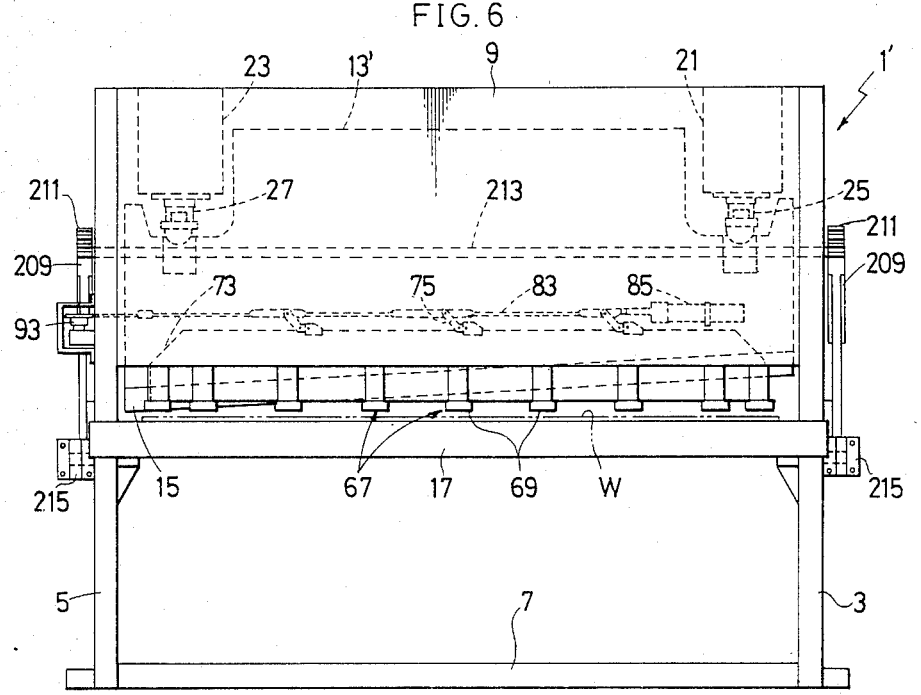
FIG. 6 is a front elevational view of a shearing machine of another embodiment of the present invention.
Figure 7:
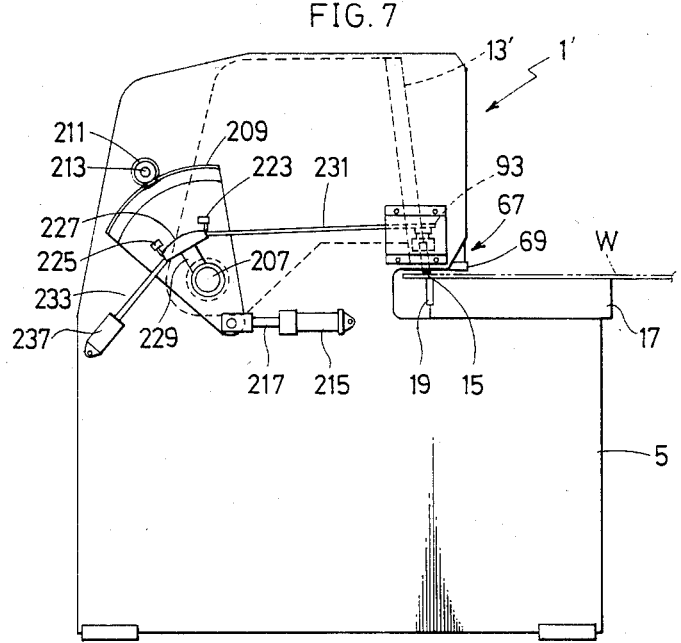
FIG. 7 is a side elevational view of the shearing machine shown in FIG. 6.
Figure 8:
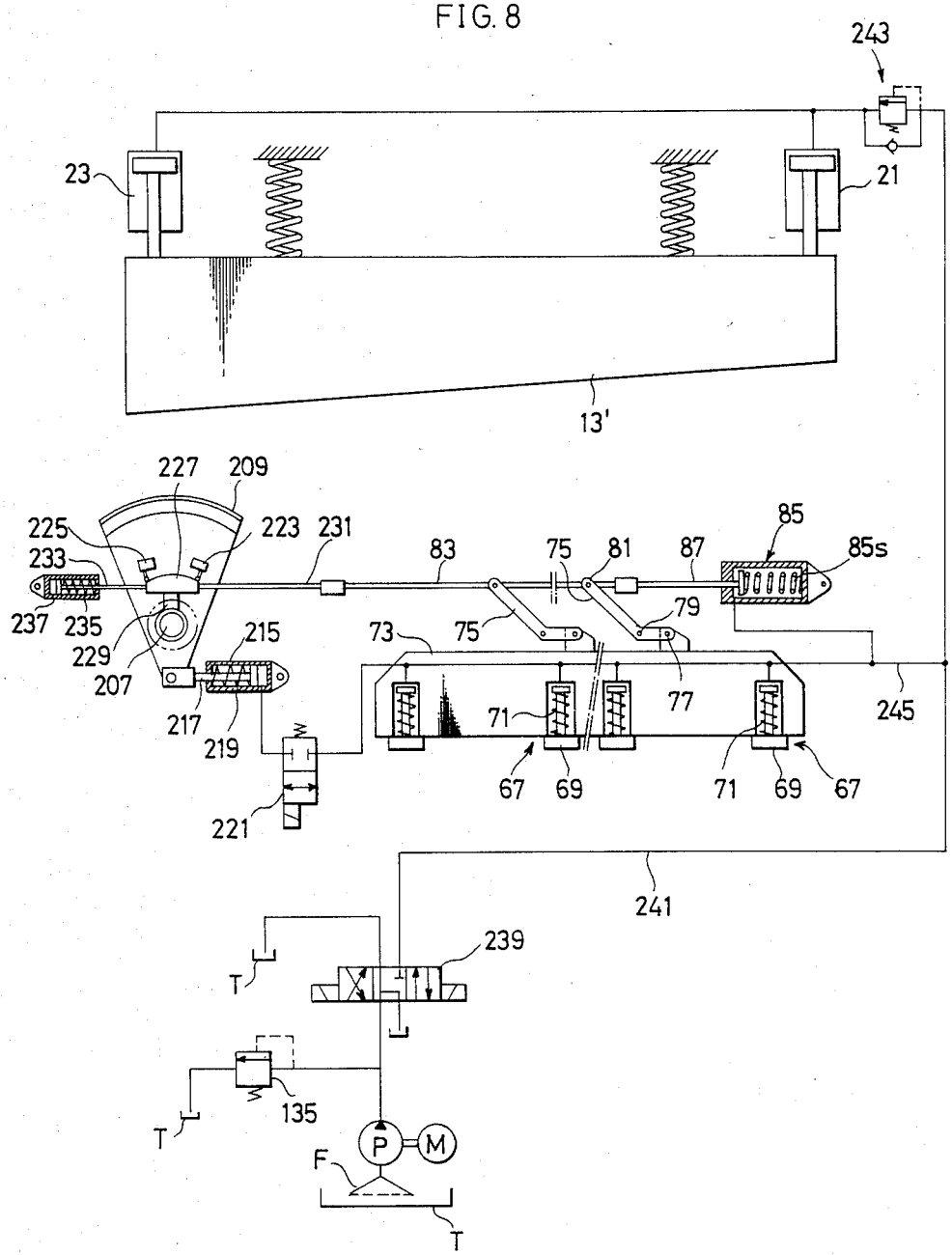
FIG. 8 is a diagrammatic view showing a hydraulic circuit of the shearing machine shown in FIG. 6.

Referring now to FIGS. 6, 7 and 8, there is shown a shearing machine 1' as a second embodiment of the principles of the present invention. Since the second embodiment is more or less similar in obstruction and function to the first embodiment shown in FIGS. 1 to 5 inclusive, elements common to the first embodiment will be given the same reference numerals as the first embodiment and will not be described in detail.

In the second embodiment, a ram 13' which is often referred to as swing beam and has an upper blade 15 mating with a lower blade 19 fixed to a work-table 17 is pivotally supported by and between upright plates 3 and 5 by means of a pair of eccentric shafts 207 rotatably held the upright plates 3 and 5. The ram 13' is so arranged to be swung up and down by a pair of hydraulic motors 21 and 23 having piston and rods 25 and 27, respectively, to swing the upper blade 15 toward and away from the lower blade 19. In order to hold down a workpiece W to be sheared, there are provided a plurality of hold-down means 67 each of which is all the same as that of the first embodiment in construction and function and therefore has a holding pad member 69 upwardly biased by a spring 71. Thus, when the ram 13' is swung down by the hydraulic motors 21 and 23, the upper blade 15 will be lowered to cooperate with the lower blade 19 to shear the workpiece W which is held down by the hold-down means 67 on the work-table 17. Also, it will be understood that the clearance between the upper and lower blades 15 and 19 can adjusted by rotating the eccentric shafts 207 as will be described in great detail hereinafter.

As best shown in FIGS. 7 and 8, in order to adjust the clearance between the upper and lower blades 15 and 19, the eccentric shafts 207 are fixed with sector gears 209 meshing with pinion gears 211 and acting as levers so as to be rotated thereby. The pinion gears 211 are connected with each other by an elongated shaft 213 which is rotatably extended between the upright plates 3 and 5 so that the sector gears 209 will rotate the eccentric shafts 207 simultaneously or synchromously. Also, in order to rotate the eccentric shafts 207, either of the sector gears 209 is so arranged as to be rotated by a hydraulic motor or cylinder 215 which has a piston and rod 217 kept biased by a spring 219 to pull the sector gear 209 and is connected to the hydraulic tank T by means of a solenoid operated valve means 221 shown in FIG. 8. More particularly, in order to rotate the sector gear 209, the piston rod 217 is extended when the hydraulic fluid is supplied into the hydraulic motor 215 through the solenoid operated valve means 221, and it will be retracted by the spring 219 when the hydraulic fluid can be drained therefrom. Thus, when the piston and rod 217 of the hydraulic motor 215 is extended and retracted, the eccentric shafts 207 will be simultaneously or synchronously rotated by the sector gears 209 to adjust the clearance between the upper and lower blades 15 and 19.

The solenoid operated valve means 221 is so arranged as to be kept normally closed and be energized to connect the hydraulic motor 215 to the hydraulic tank T when either of first and second detecting means 223 and 225 such as limit switches is contacted by a cam member 227 held by a lever member 229. The first and second detecting means 223 and 225 are fixed to either of the sector gears 209 side by side at an equal radial distance from the rotational axis thereof to be carried thereby. The lever member 229 holding the cam member 227 is rotatably held on the end of the eccentric shaft 207 in a manner such that it can be rotated thereon into and out of contact with the first and second detecting means 223 and 225.

The cam member 227 is connected by a connecting member 231 such as a wire to a pull rod 83 to which a detecting member 73 is pivotally connected by means of a plurality of lever members 75 in all the same manner as the first embodiment to detect the thickness of the workpiece W placed on the work-table 17 to be sheared. The pull rod 83 is so arranged as to be pulled by a hydraulic motor 85 having a piston and rod 87 in the same manner as the first embodiment, but it is biased by a spring 85S enclosed in the hydraulic motor 85 by means of the piston and rod 87 to raise the detecting member 73. On the other hand, the cam member 227 is connected by a connecting member 233 to a spring 235 which is enclosed in a sleeve-like member 237 pivotally connected to a position of the shearing machine 1' so that it may be biased in the direction opposite to the pull rod 83.

As shown in FIG. 8, the hydraulic motors 21 and 23 are connected to a hydraulic pump P through a solenoid operated valve means 239 by a passage 241 where a sequence and check valve means 243 is provided. The hydraulic motors 85 and 215 and the hydraulic motors of the hold-down means 67 are connected by a passage 245 to the passage 241 between the solenoid operated valve means 239 and the sequence and check valve means 243. Thus, the hydraulic fluid is initially supplied to the hydraulic motor 85 and the hydraulic motors of the hold-down means 67, and it will be delivered into the hydraulic motors 21 and 23 to lower the ram 13' after the hydraulic pressure in the passage 241 has been increased to open the sequence and check valve means 243. Also, it will be readily understood that the hydraulic motor 215 will be supplied with the hydraulic fluid from the passage 245 to extend the piston and rod 217 against the spring 219 when the solenoid operated valve means 221 is energized to be opened.

. In the above described arrangement, when the pull rod 83 is pulled by the hydraulic motor 85 against the spring 85S to lower the detecting member 73, the cam member 227 will be rotated around the eccentric shaft 207 into contact with the first detecting means 223 to energized the solenoid operated valve means 221. Thus, when the pull rod 83 is pulled, the piston and rod 217 of the hydraulic motor 215 will be urged by the hydraulic fluid to rotate the sector gears 209 to synchronously rotate the eccentric shafts 207 so as to adjust the clearance between the upper and lower blades 15 and 19. Also, when the clearance between the upper and lower blades 15 and 19 has been adjusted, the solenoid operated valve means 221 will be deenergized to stop the piston and rod 217 from moving, since the sector gear 209 has been rotated to bring the first detecting means 223 out of contact with the cam member 227. On the other hand, when the pull rod 83 is pushed by the spring 85S in the hydraulic motor 85 to raise the detecting member 73, the cam member 227 is brought into contact with the second detecting means 225 by the spring 235 to energize the solenoid operated valve means 221 to enable the piston and rod 217 to return the eccentric shafts 207 to the original position by means of the sector gears 209.

Although a preferred form of the present invention has been illustrated and described, it should be understood that the device is capable of modification by one skilled in the art without departing from the principles of the invention. Accordingly, the scope of the invention is to be limited only by the claim appended hereto.

I claim:

1. A shearing machine comprising a detecting means for detecting the thickness of a workpiece placed on a work-table, a clearance adjusting means for moving at least one of the upper and lower blades toward and away from the other to adjust the clearance therebetween, a shear angle adjusting means for adjusting the inclination of the blades with respect to each other, controlling means for controlling the adjustment of both adjusting means according to the thickness of the workpiece detected by the said detecting means, and means connected between said shear angle adjusting means and the controlling means for disengaging the shear angle adjusting means from the controlling means, whereby when the shear angle adjusting means is disengaged, the controlling means controls only the clearance between the blades and the shear angle inclination of the blades remains unchanged.

2. A shearing machine according to claim 1, in which the clearance adjusting means for moving at least one of the upper and lower blades toward and away from the other is so arranged as to move a guide means for guiding a ram member holding the upper blade.

3. A shearing machine according to claim 1, in which the adjusting means for moving at least one of the upper and lower blades towards and away from the other is so arranged as to rotate an eccentric shaft member of a swing member holding the upper blade.

4. A shearing machine comprising a detecting means for detecting the thickness of a workpiece placed on a work-table, which is so arranged that the angle or inclination of the upper blade held by a ram member to the lower blade can be adjusted by an angle or inclination adjusting means, controlling means for controlling the angle or inclination adjusting means according to the thickness of the workpiece detected by the said detecting means, and means connected between said angle adjusting means and the controlling means for disengaging the angle adjusting means from the controlling means, whereby when the angle adjusting means is disengaged, the shear angle inclination of the blades remains unchanged.

5. A shearing machine comprising a detecting means for detecting the thickness of a workpiece placed on a workpiece, an adjusting means for moving at least one of the upper and lower blades towards and away from the other to adjust the clearance therebetween, controlling means for controlling the adjustment of the said adjusting means according to the thickness of the workpiece detected by the said detecting means, said detecting means being so arranged that the angle or inclination of the upper blade to the lower blade can be adjusted and is provided with a controlling means for controlling the angle or inclination of the upper blade according to the thickness of the workpiece detected by the said detecting means, and means connected between said shear angle adjusting means and the controlling means for disengaging the shear angle adjusting means from the controlling means, whereby when the shear angle adjusting means is disengaged, the shear angle inclination of the blades remains unchanged.

6. The shearing machine according to claim 1, wherein said disengaging means comprises a hydraulic cylinder and a directional control valve.

7. The shearing machine according to claim 1, wherein said shear angle adjusting means comprises hydraulic motors connecting opposite ends of the upper blade to the shearing machine.

8. The shearing machine according to claim 1, wherein the detecting means comprises an elongated plate pivotally connected to the shearing machine by a plurality of lever members.

9. The shearing machine according to claim 1, wherein said clearance adjusting means comprises a ram supporting the upper blade, a guide member for guiding the ram, and a lever for moving the guide member, said lever being connected to the controlling means.

* * * * *